(12) United States Patent
Yamauchi et al.

(10) Patent No.: US 12,743,138 B2
(45) Date of Patent: Sep. 22, 2026

(54) ELECTRONIC APPARATUS AND SLIDE MECHANISM

(71) Applicant: LENOVO (SINGAPORE) PTE. LTD., Singapore (SG)

(72) Inventors: Takehito Yamauchi, Yokohama (JP); Shigehiro Horiuchi, Yokohama (JP); So Nakanishi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 76 days.

(21) Appl. No.: 18/966,335

(22) Filed: Dec. 3, 2024

(65) Prior Publication Data

US 2025/0278125 A1 Sep. 4, 2025

(30) Foreign Application Priority Data

Feb. 29, 2024 (JP) ................................ 2024-030267

(51) Int. Cl.
*G06F 1/16* (2006.01)

(52) U.S. Cl.
CPC ................................ *G06F 1/1686* (2013.01)

(58) Field of Classification Search
None
See application file for complete search history.

(56) References Cited

U.S. PATENT DOCUMENTS

2008/0061914 A1* 3/2008 Kim .................... H04M 1/0237 335/306
2008/0174392 A1* 7/2008 Cho .................... H04M 1/0237 335/306
2008/0182634 A1* 7/2008 Cho .................... H04M 1/0237 455/575.4
2009/0146537 A1* 6/2009 Wang .................. H04M 1/0237 312/334.1
2010/0067833 A1* 3/2010 Jin ...................... H04M 1/0237 384/8

(Continued)

FOREIGN PATENT DOCUMENTS

JP 11332210 A 11/1999
JP 2000145249 A 5/2000
JP 2023006941 A 1/2023

OTHER PUBLICATIONS

EP search report, application No. 24215937.4, dated Mar. 14, 2025.

*Primary Examiner* — James Wu
*Assistant Examiner* — Christopher L Augustin
(74) *Attorney, Agent, or Firm* — SHIMOKAJI IP

(57) ABSTRACT

An electronic apparatus includes: a slider that is movable between a first position and a second position; a shield cover on the slider, the shield cover being located to cover the front of the camera when the slider is in the first position and located to be away from the front of the camera when the slider is in the second position; a movable magnet at the slider; and a fixed magnet at the chassis. The fixed magnet has four poles of magnets. The fixed magnet is configured so that the width of the magnets at both ends is narrower than the width of the center magnets, and the center magnets have the same width and are wider than the width of the magnets at both ends. The width of the movable magnet is equal to or less than half of the width of the fixed magnet.

5 Claims, 8 Drawing Sheets

(56) References Cited

U.S. PATENT DOCUMENTS

| | | | | |
|---|---|---|---|---|
| 2011/0182029 | A1* | 7/2011 | Wu | G06F 1/1686 361/679.55 |
| 2021/0333686 | A1* | 10/2021 | Park | G03B 11/041 |
| 2022/0269149 | A1* | 8/2022 | Stone | G03B 17/565 |
| 2022/0377216 | A1* | 11/2022 | Lin | G06F 1/1686 |
| 2023/0004068 | A1* | 1/2023 | Ishikawa | H04M 1/0264 |

* cited by examiner

ELECTRONIC APPARATUS AND SLIDE MECHANISM

BACKGROUND OF THE INVENTION

Field of the Invention

The present invention relates to an electronic apparatus and a slide mechanism.

Description of the Related Art

Many electronic apparatuses, such as a laptop personal computer (laptop PC), a tablet computer (tablet PC), and a multifunctional mobile phone (smartphone), have optical devices such as a camera around the display.

Such a camera on the display chassis is typically directed to a user, and the user may feel uneasy because the camera may shoot them contrary to their intention even when the camera does not operate. When the camera is exposed, this may degrade the integrity with the frame in terms of the design. As one means of covering the camera, a manually slidable mechanical shutter including a shield cover can be used as in Japanese Unexamined Patent Application Publication No. 2023-006941.

The electronic apparatus described in Japanese Unexamined Patent Application Publication No. 2023-006941 includes a frame surrounding a display, and a camera disposed at the upper frame. The shield cover is slidable along the upper frame between a first position and a second position. The shield cover in the first position covers the camera, and the shield cover in the second position exposes the camera.

This electronic apparatus includes the movable magnet and the fixed magnet that attract to each other when the slider is in the first and second positions. This apparatus does not have a mechanical elastic material, meaning that it is free from influences from component variations or mechanical fatigue. Thus it provides a stable clicking sensation and achieves a long life.

SUMMARY OF THE INVENTION

Some of the cameras mounted on recent electronic apparatuses have a wide viewing angle, and a shutter that covers such a camera needs to slide a greater distance, but there is a limit to the lateral that width can be accommodated in the shutter mechanism.

In view of the above, the present invention aims to provide an electronic apparatus and a slide mechanism that are capable of achieving a larger sliding amount while reducing the width of the entire mechanism.

To solve the above problems, an electronic apparatus according to the first aspect of the present invention includes: a chassis having a display; an optical device disposed in the chassis to direct forward; a slider that is movable between a first position and a second position relative to the chassis; a shield cover in the slider, the shield cover being located to cover the front of the optical device when the slider is in the first position and located to be away from the front of the optical device when the slider is in the second position; a movable magnet at the slider; and a fixed magnet at the chassis, the fixed magnet having four poles of N poles and S poles in total alternately disposed in a moving direction of the slider on a face opposing the movable magnet, the movable magnet having one first magnetic pole and one second magnetic pole disposed in the moving direction on a face opposing the fixed magnet, the first magnetic pole and the second magnetic pole being disposed in order so as to attract to the fixed magnet when the slider is in the first position and the second position, two poles of the fixed magnet at both ends are narrower than central two poles in the moving direction, the N pole and the S pole of the movable magnet having a same width in the moving direction and being wider than the two poles at both ends of the fixed magnet, the total width of the movable magnet being equal to or less than half of an overall width of the fixed magnet.

A slide mechanism according to the second aspect of the present invention includes: a slider that is movable between a first position and a second position relative to a chassis; a movable magnet at the slider; and a fixed magnet at the chassis, the fixed magnet having four poles of N poles and S poles in total alternately disposed in a moving direction of the slider on a face opposing the movable magnet, the movable magnet having one first magnetic pole and one second magnetic pole disposed in the moving direction on a face opposing the fixed magnet, the first magnetic pole and the second magnetic pole being disposed in order so as to attract to the fixed magnet when the slider is in the first position and the second position, two poles of the fixed magnet at both ends are narrower than central two poles in the moving direction, the N pole and the S pole of the movable magnet having a same width in the moving direction and being wider than the two poles at both ends of the fixed magnet, the total width of the movable magnet being equal to or less than half of an overall width of the fixed magnet.

The above-described aspects of the present invention achieve a larger slide amount while suppressing the width of the entire mechanism.

BRIEF DESCRIPTION OF THE DRAWINGS

FIG. 6A shows them when the slider is in the first position, and FIG. 6B shows them when the slider is in the second position.

FIG. 7A shows them when the slider is in the first position, and FIG. 7B shows them when the slider is in the second position.

DETAILED DESCRIPTION OF THE INVENTION

The following describes an electronic apparatus and a slide mechanism according to one embodiment of the present invention in details, with reference to the drawings. The present invention is not limited to the following embodiment.

Figure 1:
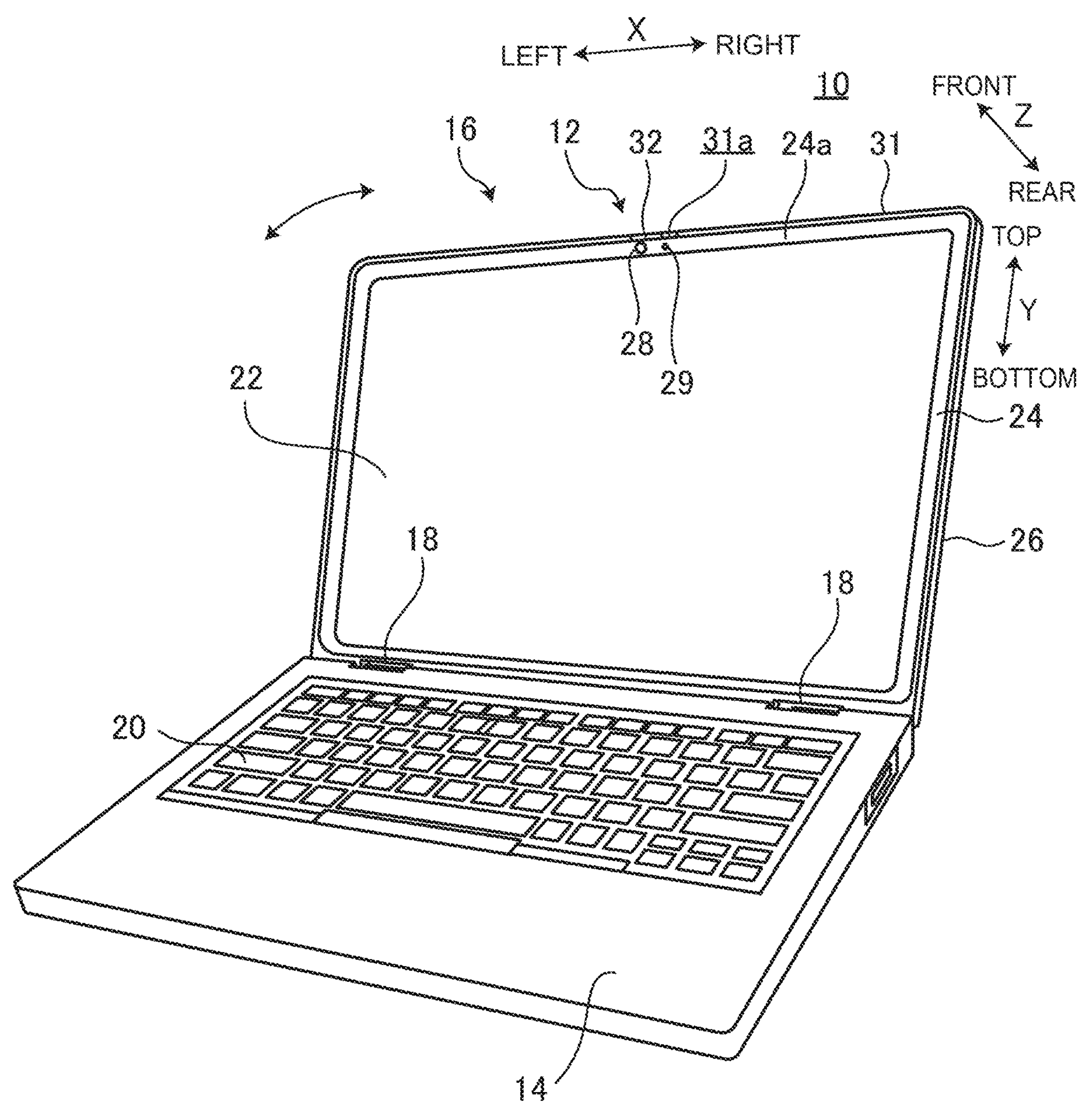
FIG. 1 is a perspective view of an electronic apparatus according to one embodiment of the present invention.

FIG. 1 is a perspective view of an electronic apparatus 10 according to one embodiment of the present invention. The electronic apparatus 10 includes a slide mechanism 12 according to one embodiment of the present invention. The electronic apparatus 10 is a laptop PC. The electronic apparatus according to the present invention is not limited to a laptop PC, which may be a desktop PC, a mobile tablet terminal, or a multifunctional mobile phone, for example.

The electronic apparatus 10 includes a body chassis 14 and a display chassis (chassis) 16 that is openable/closable relative to the body chassis 14 via hinges 18. The laptop PC with the display chassis 16 closed is compact and is suitable for mobile use. The upper face of the body chassis 14 is provided with a keyboard 20.

The following may refer to the left-right direction of the display chassis 16 as X direction, the up-down direction as Y direction, and the thickness direction of a display 22 as Z direction. For the display chassis 16, lower refers to the side connecting to the body chassis 14 via the hinges 18, and upper refers to the opposite side. X direction is the moving direction of a slider 36 described later. Y direction is the direction orthogonal to the moving direction of the slider 36 described later and the front-rear direction. For Z direction, the front refers to the direction where the front face of the display 22 faces, and the rear refers to the opposite. That is, Z direction is the front-rear direction.

The display chassis 16 includes the display 22 on the front face, i.e., on the display face, a frame (chassis) 24 surrounding the display 22, and a rear cover (chassis) 26. The frame 24 and the rear cover 26 make up a part of the chassis. The rear cover 26 and the frame 24 are made of resin materials. The rear cover 26 has a slightly larger area than the display 22 and covers the rear face of the display 22. The display 22 is a rectangular, thin color liquid crystal display, and occupies a major part of the front face of the display chassis 16. The frame 24 is narrow, which may be called a narrow bezel.

Figure 2:
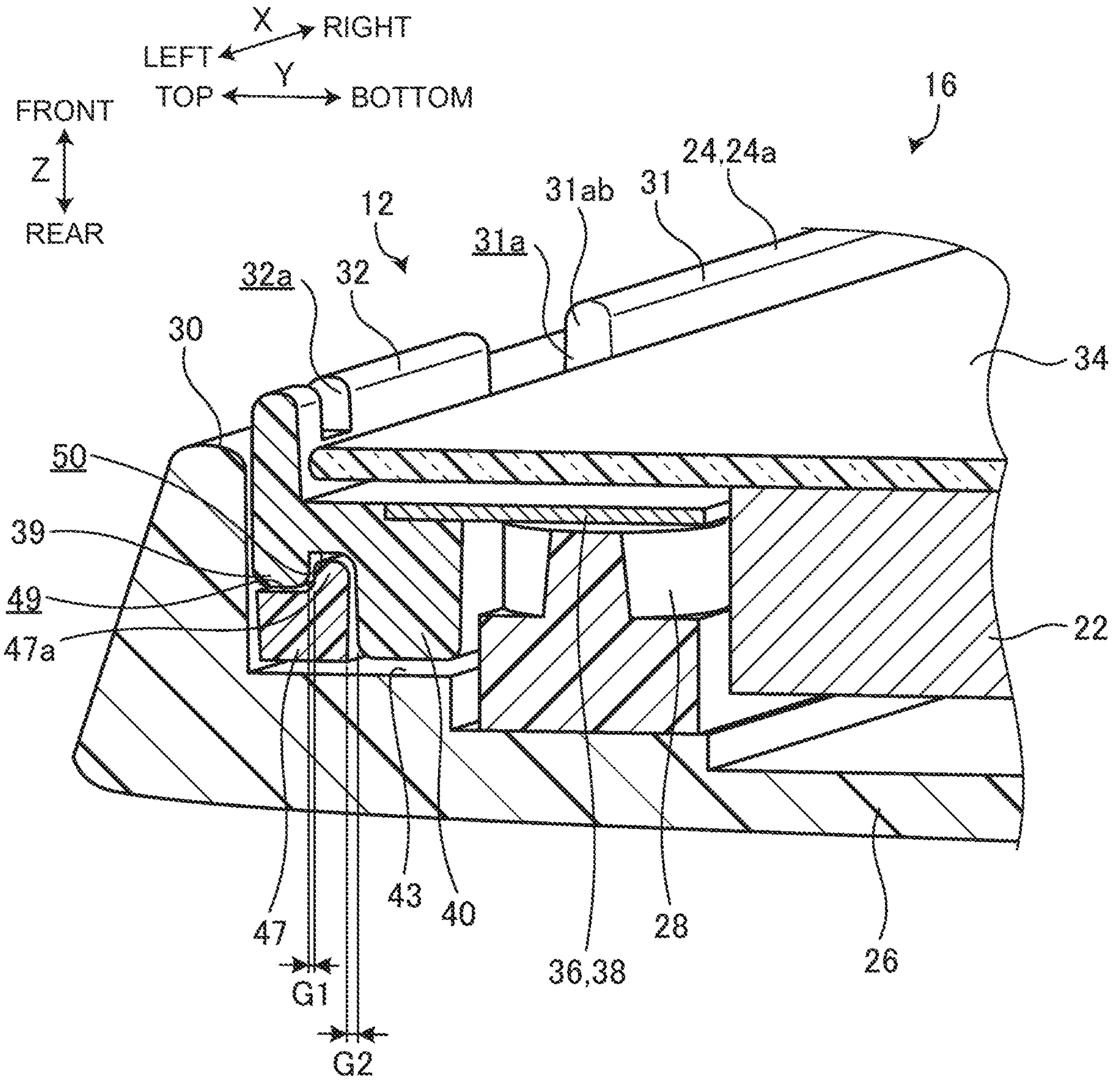
FIG. 2 is a cross-sectional perspective view of an upper portion of the display chassis including a groove.

FIG. 2 is a cross-sectional perspective view of an upper portion of the display chassis 16 including a groove 31*a*. As illustrated in FIGS. 1 and 2, a camera (optical device) 28 and a camera lamp (optical device) 29 are placed at the rear cover 26 in a position behind an upper frame 24*a* of the frame 24 so that the camera 28 and the camera lamp 29 face forward.

The display chassis 16 has a glass 34 on the front face. The glass 34 covers the front portion of the display 22 and of the upper frame 24*a*. The portion of the glass 34 that covers the upper frame 24*a* is colored in black so that the structure of the upper frame 24*a* is invisible. The portion of the glass 34 that is located in front of the camera 28 and the camera lamp 29 has no color and serves a transparent window to expose these devices. The camera 28 and the camera lamp 29 may be shielded by a first shield cover 46*a* and a second shield cover 46*b* described later. The camera 28 is placed at a substantially center position of the upper frame 24*a* in the left-right direction. A microphone and an infrared port may be disposed at the upper frame 24*a*.

A narrow edge wall 30 surrounds the circumference of the rear cover 26. A narrow circumferential wall 31 surrounds almost the entire circumference of the frame 24. The circumferential wall 31 is substantially in contact with the inner circumference of the edge wall 30. The circumferential wall 31 protrudes slightly from the front edge of the edge wall 30.

The circumferential wall 31 has a groove 31*a* at a substantially center of the upper frame 24*a*. The groove 31*a* is provided with an operation knob 32. The operation knob 32 is narrower in X direction than the groove 31*a*. The operation knob 32 and the circumferential wall 31 have the same width in Y direction. The operation knob 32 protrudes forward from between the edge wall 30 and the glass 34 to the same extent as the circumferential wall 31 protrudes. The operation knob 32 is small enough to fit within the width of the circumferential wall 31 in Y direction and Z direction and be less conspicuous, and is favorable in appearance.

The operation knob 32 is a part of the slider 36 (see FIG. 3) described later, and slides in X direction together with the slider 36. In other words, the slider 36 is movable in X direction relative to the display chassis 16 between a first position and a second position. The operation knob 32 is slidable between the first position (see FIG. 6A) and the second position (see FIG. 6B) within the width of the groove 31*a*. The operation knob 32 has a cutout 32*a*, which allows the user to operate the operation knob 32 easily with a finger or a nail. The cutout 32*a* is located just above the camera 28 when the slider 36 is in the first position, which enables the user to operate the operation knob 32 intuitively to cover the camera 28.

Figure 3:
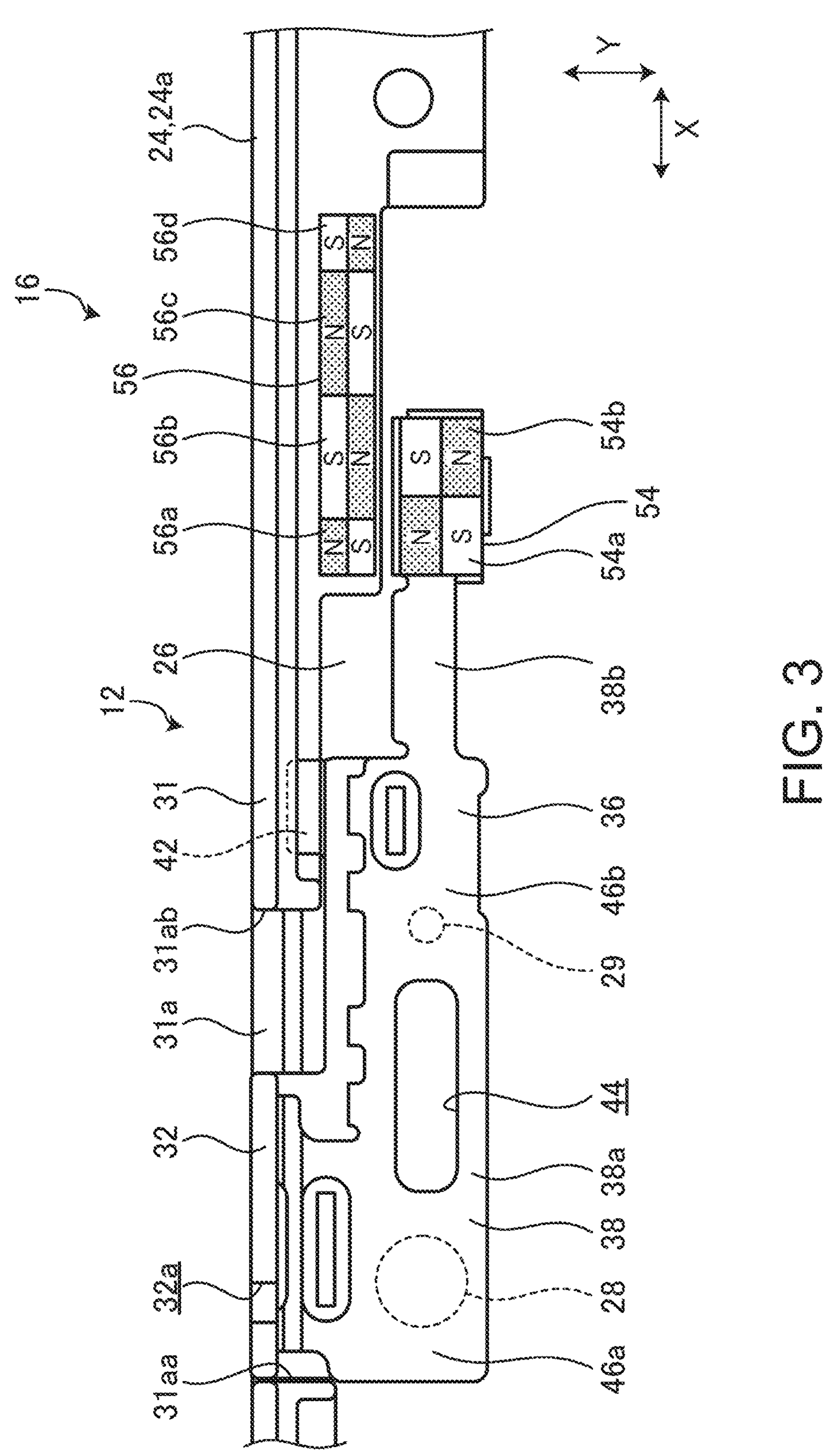
FIG. 3 is an enlarged front view of the upper frame in the display chassis when the slider is in the first position.
Figure 4:
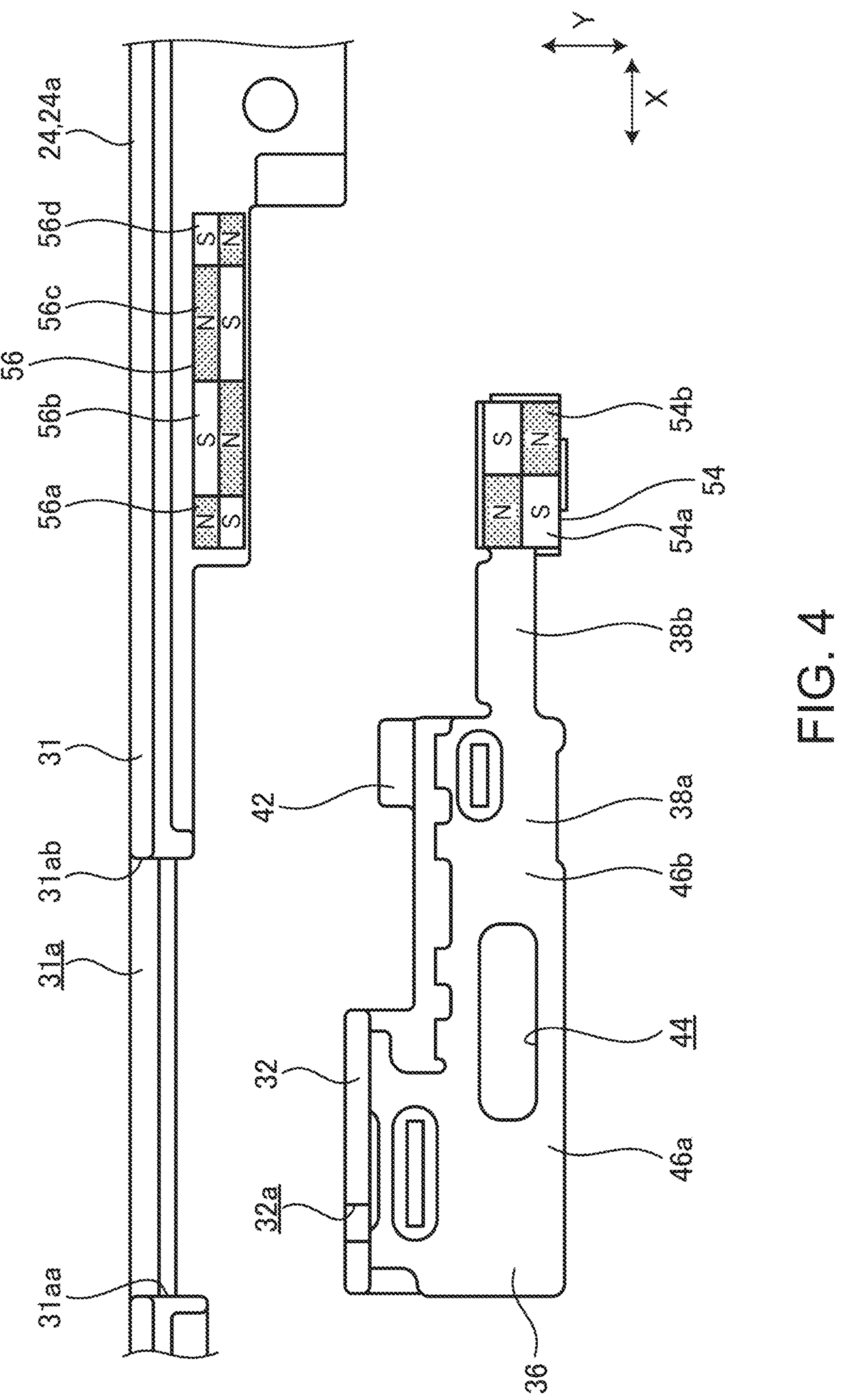
FIG. 4 is an exploded front view of the upper frame and the slider.

FIG. 3 is an enlarged front view of the upper frame 24*a* in the display chassis 16 when the slider 36 is in the first position. FIG. 3 omits the glass 34 so that the structure of the upper frame 24*a* is visible. FIG. 4 is an exploded front view of the upper frame 24*a* and the slider 36.

As illustrated in FIG. 3 and FIG. 4, the upper frame 24*a* is provided with the slider 36. The slider 36 is movable in the direction along the edge wall 30 (i.e., in X direction). When the slider 36 moves to the leftmost in the front view, the operation knob 32 abuts a first contact portion 31*aa* at the left end of the groove 31*a* to be restricted in movement to the left (see FIG. 3). This position of the slider 36 is referred to as the first position. When the slider 36 is displaced to the rightmost in the front view, the operation knob 32 abuts a second contact portion 31*ab* at the right end of the groove 31*a* to be restricted in movement to the right. This position of the slider 36 is referred to as the second position. In this embodiment, the first position is on the left in X direction (one side along the moving direction), and the second position is on the right (the other side along the moving direction).

The slider 36 includes a metal plate 38 that is the base. The metal plate 38 is made of a ferrite material. The metal plate 38 has a substantially rectangular main portion 38*a* on the left and an arm 38*b* protruding from the lower part of the main portion 38*a* to the right. The upper left portion of the main portion 38*a* is integral with the operation knob 32. A first guide protrusion piece 39 (see FIG. 2) and a first slide piece 40 (see FIG. 2) are placed behind the operation knob 32. The upper right portion of the main portion 38*a* is integral with a second slide piece 41 (see FIG. 5) protruding rearward and a second guide protrusion piece 42 protruding upward from the rear end of the second slide piece 41 (see FIG. 5).

The main portion 38*a* has a horizontally long exposure hole 44 in a substantially center. A portion of the main portion 38*a* on the left of the exposure hole 44 is a first shield cover 46*a*, and a portion on the right is a second shield cover 46*b*. When the slider 36 is in the first position (see FIG. 3), the first shield cover 46*a* is positioned to cover the front of the camera 28 and the second shield cover 46*b* is positioned to cover the front of the camera lamp 29. When the slider 36 is in the second position, the first shield cover 46*a* is positioned away from the front of the camera 28 and the second shield cover **46*b* is positioned away from the front of the camera lamp 29. When the slider 36 is in the second position, the camera lamp 29 is exposed through the exposure hole 44**.

Referring back to FIG. 2, the first guide protrusion piece 39 protrudes slightly rearward while being continuous with the operation knob 32. The rear cover 26 has a guide pedestal 47 at the corner of the edge wall 30 and the bottom face 43. The guide pedestal 47 has a protrusion piece **47*a* that slightly protrudes forward from the lower portion. The protrusion piece 47*a* and the edge wall 30 define a first guide groove 49** therebetween.

The first slide piece 40 is located slightly below the first guide protrusion piece 39 and protrudes rearward in parallel with the first guide protrusion piece 39. The first slide piece 40 abuts and slides on the bottom face 43. The first slide piece 40 has an appropriate width in Y direction, and thus allows the slider 36 to be stably supported and be slidable relative to the rear cover 26. The first guide protrusion piece 39 and the first slide piece 40 define a second guide groove 50 therebetween.

The first guide protrusion piece 39 fits into the first guide groove 49, and the protrusion piece **47*a* fits into the second guide groove 50. This configuration restricts the displacement of the slider 36 in Y direction and properly guides the slider 36 in X direction during sliding. In this way, the protrusion piece 47*a* serves as a rail guide that guides the slider 36** in X direction.

Note here that a narrow gap G1 in Y direction is formed between the first guide protrusion piece 39 and the protrusion piece **47*a*, and a narrow gap G2 in Y direction is formed between the protrusion piece 47*a* and the first slide piece 40. In this way, the slider 36 is allowed to tilt somewhat. When the slider 36 is in the first position or the second position, the slider 36 is biased upward by the attraction action between a movable magnet 54 and a fixed magnet 56, which will be described later, so that no gap is formed between the first guide protrusion piece 39 and the edge wall 30**. This gives favorable appearance.

Figure 5:
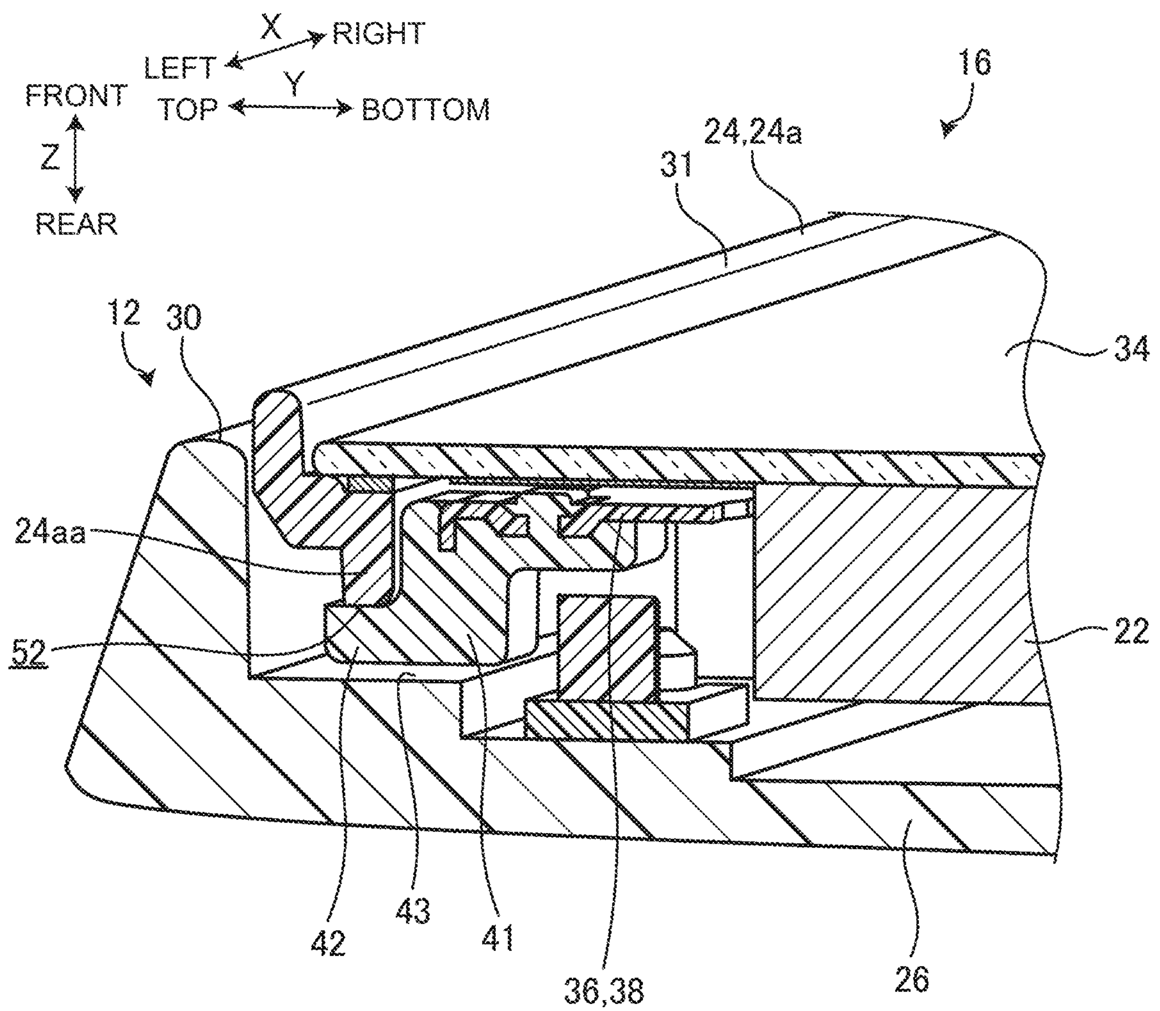
FIG. 5 is a cross-sectional perspective view of an upper portion of the display chassis including the second guide protrusion piece.

FIG. 5 is a cross-sectional perspective view of an upper portion of the display chassis 16 including the second guide protrusion piece 42. The rear face of the second slide piece 41 and the rear face of the second guide protrusion piece 42 define a continuous surface, and abut and slide on the bottom face 43. These rear faces of the second slide piece 41 and the second guide protrusion piece 42 have an appropriate area and thus allow the slider 36 to be stably supported and slide relative to the rear cover 26.

A part of the upper frame **24*a* forms a protrusion piece 24*aa* protruding rearward. The protrusion piece 24*aa* and the bottom face 43 define a guide gap 52 therebetween. The second guide protrusion piece 42 fits into the guide groove 52. This configuration restricts the displacement of the slider 36 in Z direction and properly guides the slider 36 in X direction during sliding. In this way, the protrusion piece 24*aa* serves as a rail guide that guides the slider 36 in X direction. When the slider 36 is in the first position or the second position, the slider 36 is biased upward by the attraction action between the fixed magnet 56 and the movable magnet 54, which will be described later, so that the second guide protrusion piece 42 comes in contact with the edge wall 30 and is restricted in displacement upward so as to be stable. Note that the second guide protrusion piece 42** is not restricted in downward displacement.

Referring back to FIG. 3 and FIG. 4, the arm **38*b* is provided with the movable magnet 54 at the right end. A part of the arm 38*b* is bent to wrap the movable magnet 54 for holding (see also FIG. 8). The movable magnet 54 is of a square upper and lower double-sided multi-pole magnetized type, and is magnetized so that the N pole and the S pole are disposed from left to right on the upper side to have a two-pole configuration. The movable magnet 54 is magnetized so that the S pole and the N pole are disposed from left to right on the lower side. For convenience, these magnetized parts are referred to as magnets 54*a* and 54*b*** from left to right, but they may be referred to as other names such as magnetic pole parts. In each drawing of the present application, the N poles are illustrated with dots so that the polarity can be easily identified.

The upper frame **24*a* is provided with the fixed magnet 56 at the portion above the range where the movable magnet 54 moves in X direction. That is, the fixed magnet 56 and the movable magnet 54 are placed side by side in Y direction, which suppresses the thickness of the display chassis 16** in Z direction.

Figure 8:
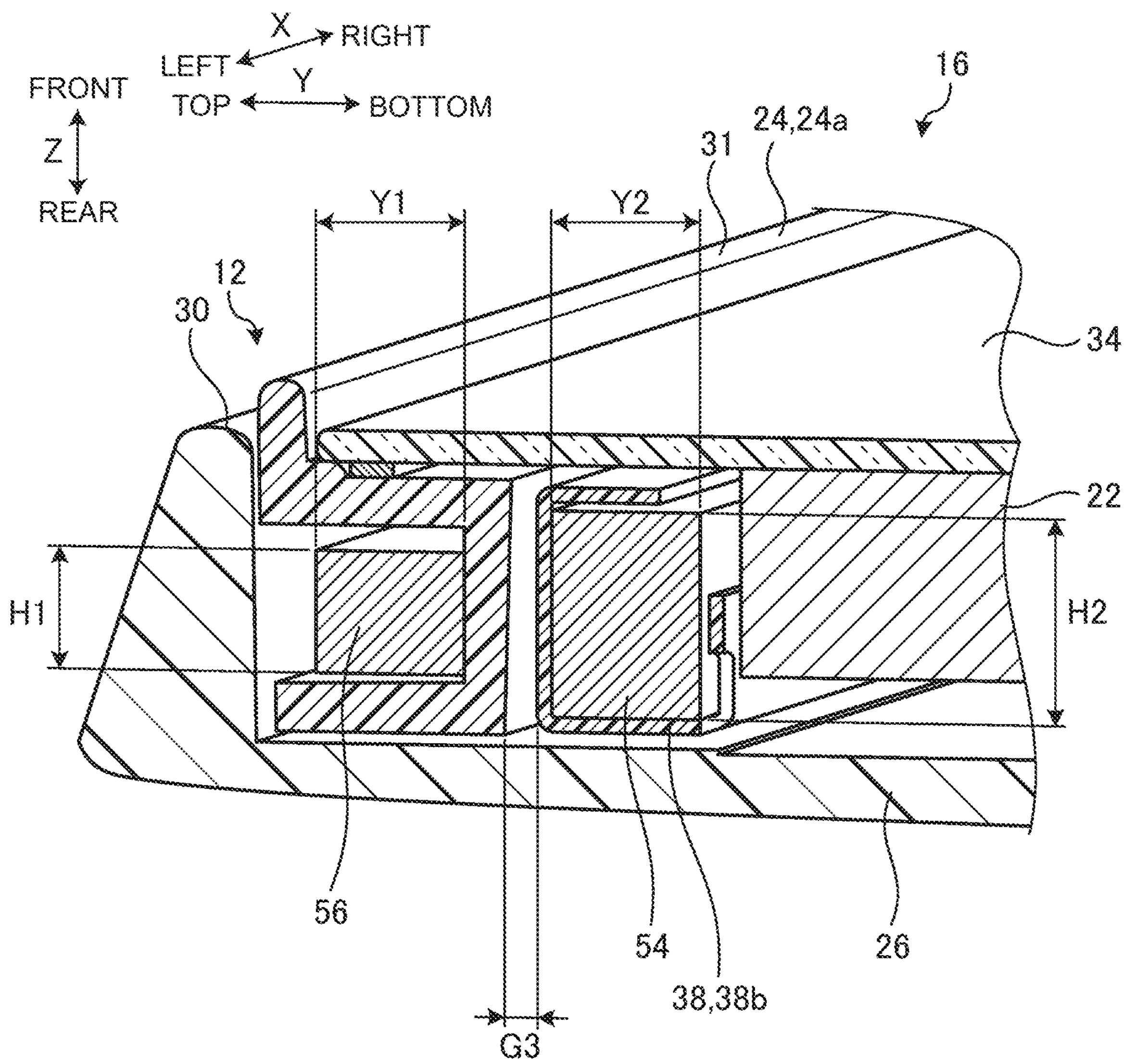
FIG. 8 is a cross-sectional perspective view of an upper portion of the display chassis including the fixed magnet and the movable magnet.

The fixed magnet 56 is held by a part of the upper frame **24*a* (see also FIG. 8). The fixed magnet 56 is of a square upper and lower double-sided multi-pole magnetized type, and is magnetized so that the S pole, the N pole, the S pole, and the N pole are disposed from left to right on the lower side to have a four-pole configuration. The fixed magnet 56 is magnetized so that the N pole, the S pole, the N pole, and the S pole are disposed from left to right on the upper side. For convenience, these magnetized parts are referred to as magnets 56*a*, 56*b*, 56*c* and 56*d*** from left to right, but they may be referred to as other names such as magnetic pole parts.

That is, the fixed magnet 56 may have four poles of N poles and S poles in total alternately disposed in X direction of on a face opposing the movable magnet 54. The fixed magnet 54 may have two poles of N pole and S pole in total disposed in X direction of on a face opposing the fixed magnet 56, that is, these poles are placed in order so that the movable magnet 54 attract to the fixed magnet 56 when the slider 36 is in the first and second positions (see FIG. 6). The movable magnet 54 has two fewer poles than the fixed magnet 56.

Figure 6A:
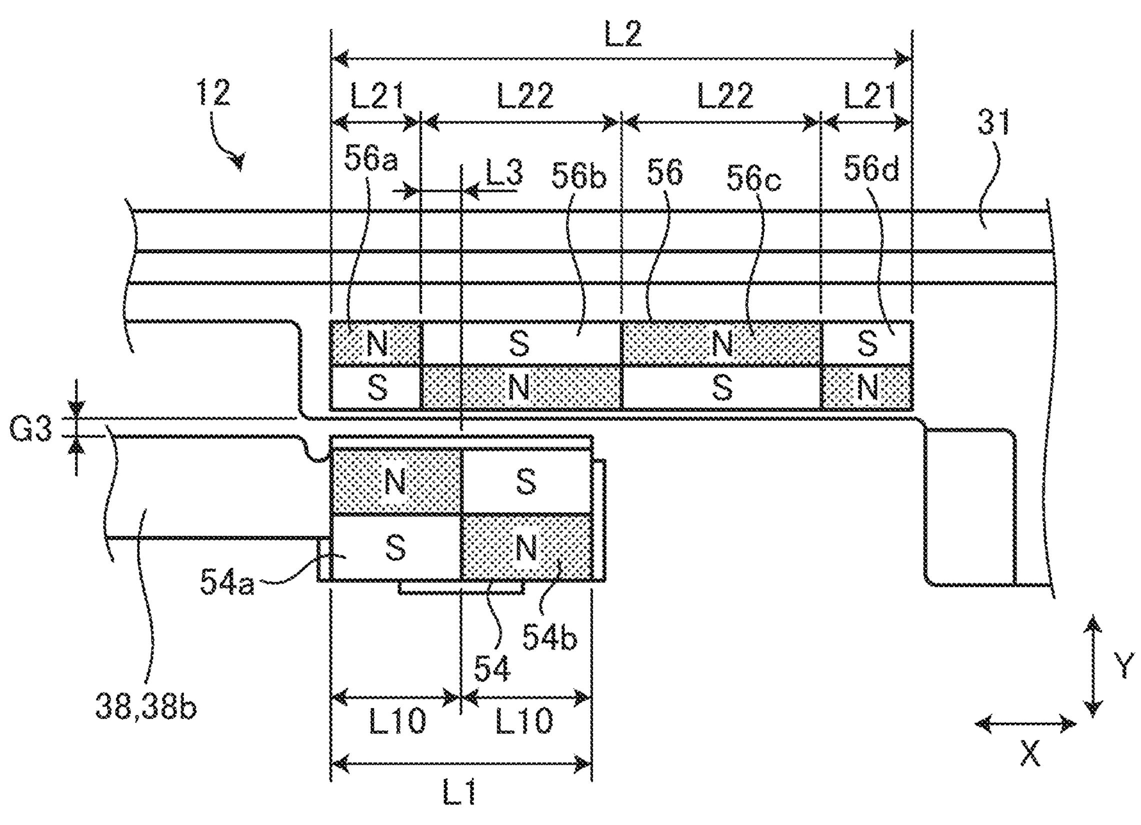
FIGS. 6A-6B illustrate the movable magnet, the fixed magnet and their peripheral, where
Figure 6B:
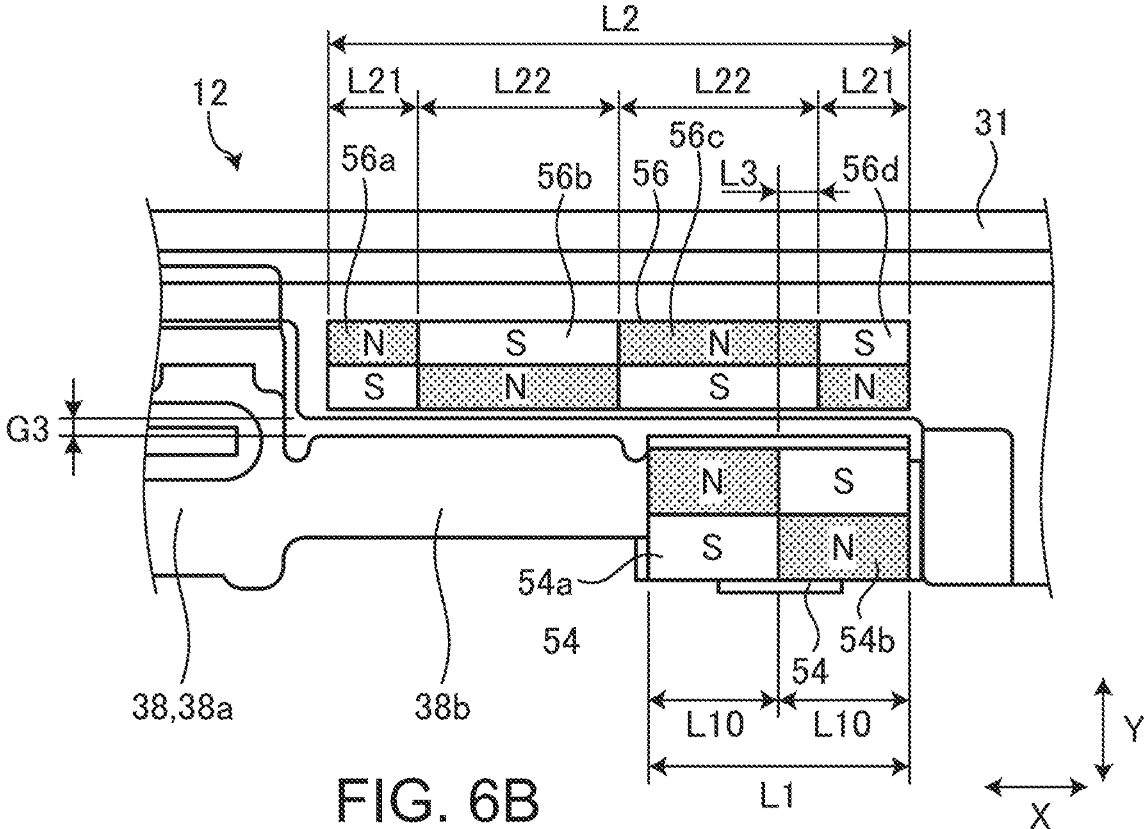

FIG. 6 schematically illustrates the movable magnet 54, the fixed magnet 56 and their peripheral; where FIG. 6A shows them when the slider 36 is in the first position, and FIG. 6B shows them when the slider 36 is in the second position.

The dimensions of the movable magnet 54 and fixed magnet 56 are described below, all of which are just examples. The width L1 of the movable magnet 54 in X direction is 4 mm. The width L2 of the fixed magnet 56 in X direction is 9 mm. The width L10 of the magnets **54*a* and 54*b* in X direction is 2 mm, which is half of L1. The widths of the magnets 56*a* and 56*d* at both ends of the fixed magnet 56 are equal and indicated as L21; L21 is 1.4 mm. The widths of the central magnets 56*b* and 56*c* are equal and indicated as L22; L22 is 3.1 mm. The fixed magnet 56 is formed by magnetizing a single magnetic material, meaning that there is no gap between the magnet 56*b* and magnet 56*c*, and a strong magnetic force is generated by an appropriately large width L22**.

In other words, the fixed magnet 56 is configured in X direction so that the two-pole magnets **56*a* and 56*d* at both ends are narrower than the central two-pole magnets 56*b* and 56*c*. The movable magnet 54 is configured in X direction so that the magnets 54*a* and 54*b* have the same width and are wider than the magnets 56*a* and 56*d*, and the total width L1 is equal to or less than half of the overall width L2 of the fixed magnet 56. Such a length L1 of the movable magnet 54, which is set sufficiently shorter than the width L2 of the fixed magnet 56, keeps its long operating stroke. This also reduces the weight of the slider 36** that is a moving body, which improves the dynamic characteristics of the moving body.

When the slider 36 is located in the first position (FIG. 6A) or in the second position (FIG. 6B), the fixed magnet 56 and the movable magnet 54 face each other with partially the same poles overlapping. Specifically, in the first position, the N-pole magnet 54*a* and magnet 56*b* partially overlap, and in the second position, the S-pole magnet 54*b* and magnet 56*c* partially overlap. The width L3 of these overlapping is narrower than the width L21 of the magnets 56*a* and 56*d* at both ends of the fixed magnet 56.

As illustrated in FIG. 6A, which shows the slider 36 in the first position, the movable magnet 54 and the fixed magnet 56 are placed so that different poles face each other and attract each other. Specifically, a part of the N pole of the magnet 54*a* and a part of the S pole of the magnet 56*a* face each other and a part of the S pole of the magnet 54*b* and a part of the N pole of the magnet 56*b* face each other to attract each other. This keeps the slider 36 in the first position. When the slider 36 is in the first position, the first contact portion 31*aa* (see FIG. 3) restricts the slider 36 from moving leftward. In this state, the left ends of the movable magnet 54 and of the fixed magnet 56 are positioned to almost coincide with each other.

As illustrated in FIG. 6B, which shows the slider 36 in the second position, the movable magnet 54 and the fixed magnet 56 are placed so that different poles face each other and attract each other. Specifically, a part of the N pole of the magnet 54*a* and a part of the S pole of the magnet 56*c* face each other and a part of the S pole of the magnet 54*b* and a part of the N pole of the magnet 56*d* face each other to attract each other. This keeps the slider 36 in the second position. When the slider 36 is in the second position, the second contact portion 31*ab* (see FIG. 3) restricts the slider 36 from moving rightward. In this state, the right ends of the movable magnet 54 and of the fixed magnet 56 are positioned to almost coincide with each other.

In this way, when the slider 36 is in the first position, the left ends of the fixed magnet 56 and the movable magnet 54 are in the same position, and when the slider 36 is in the second position, the right ends of the fixed magnet 56 and the movable magnet 54 are in the same position. In this way, the movable magnet 54 effectively utilizes the entire length of the width L2 of the fixed magnet 56 to keep its long stroke amount. If the left end of the movable magnet 54 in the first position and the right end of the movable magnet 54 in the second position protrude beyond the range of width L2 of the fixed magnet 56, the space occupied by the slide mechanism 12 will become large. Thus, it is desirable to keep them within the range of width L2. The stroke amount between the first and second positions of the slider 36 in this embodiment achieves 4.9 mm.

Figures 7A, 7B:
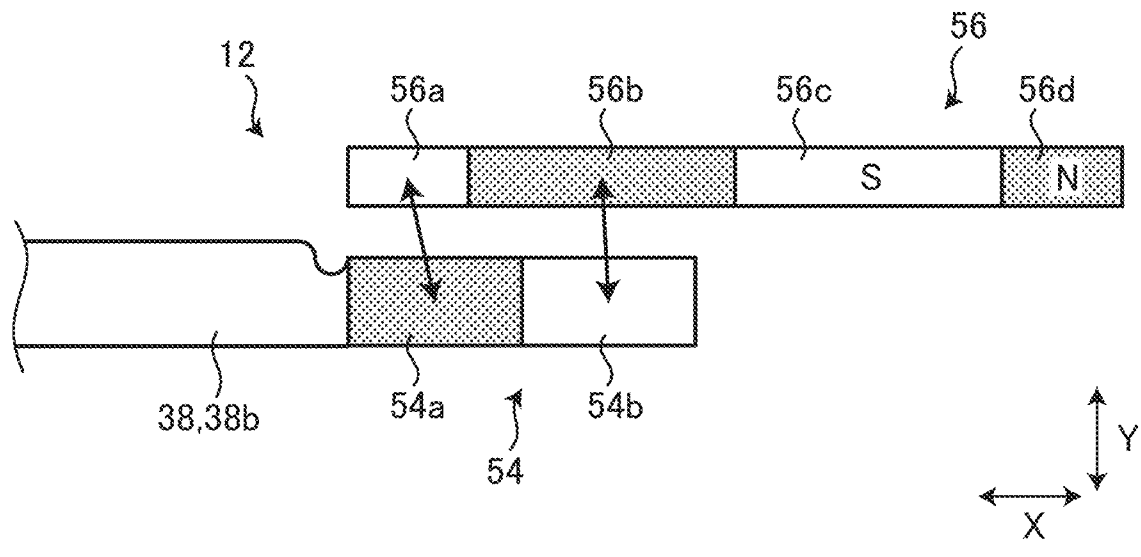
FIGS. 7A-7B schematically illustrate the movable magnet and the fixed magnet that face each other; where

FIG. 7 schematically illustrates the movable magnet 54 and the fixed magnet 56 that face each other; where FIG. 7A shows them when the slider 36 is in the first position, and FIG. 7B shows them when the slider 36 is in the second position. In FIG. 7, the attractive forces between the S pole and N pole of the movable magnet 54 and the fixed magnet 56 are schematically indicated by arrows.

As illustrated in FIG. 7A, when the slider 36 is in the first position, the center of the magnet 54*a* is slightly shifted to the right in X direction from the center of the magnet 56*a*, and the center of the magnet 54*b* is slightly shifted to the right in X direction from the center of the magnet 56*b*. With this arrangement, the movable magnet 54 and the left half of the fixed magnet 56 are attracted to each other in Y direction, and the slider 36 is biased to the left in X direction so that the operation knob 32 of the slider 36 is pressed against the first contact portion 31*aa*.

The left ends of the movable magnet 54 and the fixed magnet 56 are positioned to almost coincide with each other. Here, the width L10 of the magnet 54*a* is wider than the width L21 of the magnet 56*a*, and thus the direction of the attractive force between them is moderately and significantly inclined, so that the movable magnet 54 is reliably biased to the left, and the slider 36 will not wobble to the right even if a small external force is applied. Furthermore, the width L22 of the magnet 56*b* is set larger than the width L10 of the magnet 54*b*, creating a strong magnetic force and providing a reasonably strong attractive force between these magnet 56*b* and magnet 54*b*.

As illustrated in FIG. 7B, when the slider 36 is in the second position, the center of the magnet 54*a* is slightly shifted to the left in X direction from the center of the magnet 56*c*, and the center of the magnet 54*b* is slightly shifted to the left in X direction from the center of the magnet 56*d*. With this arrangement, the movable magnet 54 and the right half of the fixed magnet 56 are attracted to each other in Y direction, and the slider 36 is biased to the right in X direction so that the operation knob 32 of the slider 36 is pressed against the second contact portion 31*ab*.

The right ends of the movable magnet 54 and the fixed magnet 56 are positioned to almost coincide with each other. Here, the width L10 of the magnet 54*b* is wider than the width L21 of the magnet 56*d*, and thus the direction of the attractive force between them is moderately and significantly inclined, so that the movable magnet 54 is reliably biased to the right, and the slider 36 will not wobble to the left even if a small external force is applied. Furthermore, the width L22 of the magnet 56*c* is set larger than the width L10 of the magnet 54*a*, creating a strong magnetic force and providing a reasonably strong attractive force between these magnet 56*c* and magnet 54*a*.

In other words, conceptually, the narrow magnets 56*a* and 56*d* bias the movable magnet 54 in the left-right direction, while the attractive force of these magnets tends to be small. Then, the wide magnets 56*c* and 56*d*, which have a strong attractive force, compensate for the static upward biasing force and the dynamic biasing force during sliding.

While the width L21 of the magnets 56*a* and 56*d* is relatively narrow, they have a minimum, large width L3 (see FIG. 6) where the same poles overlap each other on their facing portion. If the width L3 is excessively wide, the repulsion force between the same poles will increase, reducing the attractive force between different poles. In this embodiment, the width L3 is limited to be narrower than the width 21, which keeps an optimal attractive force.

The movable magnet 54 and the fixed magnet 56 are always separated from each other, and a narrow gap G3 is formed therebetween when the slider 36 is in the first or second position (see also FIG. 8). This gap acts to bias the slider 36 to be attracted upward by the movable magnet 54, and to press the second guide protrusion piece 42 against the edge wall 30 (see FIG. 5). Appropriately setting the gap G3 keeps the movable magnet 54 and the fixed magnet 56 to be separated from each other even if there is some dimensional error or vibrations during operation.

In this way, when the slider 36 is in the first position or the second position, the operation knob 32 comes in contact with the first contact portion 31*aa* or the second contact portion 31*ab* without a gap, and the second guide protrusion piece 42 comes in contact with the edge wall 30 without a gap. The operation knob 32 and the second guide protrusion piece 42 are also appropriately pressed against there to be stable without rattling in X and Y directions. This improves the usability of the apparatus.

FIG. 8 is a cross-sectional perspective view of an upper portion of the display chassis 16 including the fixed magnet 56 and the movable magnet 54. As described above, the fixed magnet 56 is held by the upper frame 24*a* of a resin material, and the movable magnet 54 is held by the arm 38*b* of a ferrite material. The display chassis 16 is thin, and the upper frame 24*a* is made of a resin material and needs to have an appropriate thickness from the viewpoint of strength and molding conditions. The fixed magnet 56 therefore has width H1 in Z direction that is slightly narrow due to these restrictions. The arm 38*b* is made of a ferrite material that is a metal plate, and can be made thin while maintaining its strength. The movable magnet 54 is therefore allowed to have an appropriately large width H2 (H2>H1). That is, while width H1 of the fixed magnet 56 is somewhat small, width H2 of the movable magnet 54 is set to be somewhat large. This keeps the magnetic force (attraction and repulsive forces) between these magnets appropriately large.

The movable magnet 54 has ferrite on the non-attracting face opposite to the attracting face. This prevents magnetic leakage to the non-attracting face while guiding the magnetic flux to the attracting face to increase the magnetic flux density on the attracting face. This increases the attracting force of the movable magnet 54 and provides better feeling. The ferrite material is magnetically attracted, and is attracted to the movable magnet 54 during assembly, which facilitates the assembly. The width Y1 of the fixed magnet 56 in Y direction and the width Y2 of the movable magnet 54 in Y direction may be dimensions that allow mounting in the surrounding area of the display 22 of a typical display chassis 16.

As illustrated in FIG. 3, when the slider 36 is in the first position, the first shield cover 46*a* covers the camera 28, and the second shield cover 46*b* covers the camera lamp 29. As described above, the slider 36 is kept in the first position by the attractive action between the movable magnet 54 and the fixed magnet 56, and is biased to the left and upward so as not to rattle.

When the camera 28 is used, the user moves the operation knob 32 to the right until the slider 36 moves to the second position. For this operation, the gap G3 is kept between the movable magnet 54 and the fixed magnet 56. This prevents the slider 36 from generating unpleasant frictional resistance at least in this portion, so that the operation knob 32 starts to move smoothly. Note here that the movable magnet 54 and the fixed magnet 56 are attracted to each other at the first position, and this generates an appropriate magnetic resistance that the user feels to move the slider 36, and this resistance increases with the amount of movement.

When the slider 36 is in the second position, the first shield cover 46*a* is positioned away from the front of the camera 28 and the second shield cover 46*b* is positioned away from the front of the camera lamp 29. The camera 28 and the camera lamp 29 then are exposed on the front, so that their functions of the optical devices become effective. As described above, the slider 36 is kept in the second position by the attractive action between the movable magnet 54 and the fixed magnet 56, and is biased to the right and upward so as not to rattle. Movement of the slider 36 from the second position to the first position is the reverse operation of the above, so the description thereof will be omitted.

While the slider 36 is moving between the first position and the second position (not illustrated), the N pole of the magnet 54*a* and the N pole of the magnet 56*b* face each other and the S pole of the magnet 54*b* and the S pole of the magnet 56*c* face each other, and they repel each other due to the repulsion force between the same poles facing each other. Thus, the user feels a moderate sense of resistance, and beyond the midpoint, feels the reversal of direction of the acting force due to the attractive force. This gives a user a moderate clicking sensation.

As described above, the gap G1 is formed between the first guide protrusion piece 39 and the protrusion piece 47*a*, and the gap G2 is formed between the protrusion piece 47*a* and the first slide piece 40. Further, the second guide protrusion piece 42 is not restricted in downward displacement. In this way, the slider 36 is allowed to tilt somewhat. With this configuration, when a repulsive force is generated between the movable magnet 54 and the fixed magnet 56, the arm 38*b* on the right of the slider 36 tilts starting from the main portion 38*a* on the left, so that the movable magnet 54 and the fixed magnet 56 are further separated from the above-mentioned gap G3. This mitigates the repulsive force acting between the movable magnet 54 and the fixed magnet 56 somewhat, and prevents excessive resistance to move the slider 36. This also prevents excessive friction from being generated between the first guide protrusion piece 39 (see FIG. 2) or the first slide piece 40 and the first guide groove 48 and the second guide groove 50. In the case of the operation knob having the mechanism including the blade spring as in Japanese Unexamined Patent Application Publication No. 2023-006941, the operation knob is slightly tilted by the action of the blade spring during the operation. The present embodiment also involves similar tilting, so that the user is allowed to operate the operation knob without any discomfort compared to the conventional mechanism.

As described above, the fixed magnet 56 of the electronic apparatus 10 is configured in X direction so that the two-pole magnets 56*a* and 56*d* at both ends are narrower than the central two-pole magnets 56*b* and 56*c*. The movable magnet 54 is configured in X direction so that the magnets 54*a* and 54*b* have the same width and are wider than the magnets 56*a* and 56*d* of the fixed magnet 56. This allows the directions of the attractive forces mainly between the magnets 54*a* and 56*a* and between the magnets 54*b* and 56*d* to be moderately inclined, and thus generates an appropriate biasing force to the left and right. This therefore keeps a large sliding amount of the slider 36 while restricting the width of the slide mechanism 12 in X direction. Further, the total width L1 is equal to or less than half the overall width L2 of the fixed magnet 56, meaning that sliding over the entire length of the width L2 allows a stroke amount of at least L2/2 to be kept.

The present invention is not limited to the above-described embodiments, and can be modified freely without deviating from the scope of the present invention.

The invention claimed is:

1. An electronic apparatus comprising:

a chassis having a display;

an optical device in the chassis;

a slider that is movable between a first position and a second position relative to the chassis;

a shield cover in the slider, the shield cover being located to cover a front of the optical device when the slider is in the first position and located to be away from the front of the optical device when the slider is in the second position;

a movable magnet at the slider; and a fixed magnet at the chassis, the fixed magnet having two fixed rows of fixed N poles and fixed S poles, a total of four poles of fixed N poles and fixed S poles in each of the fixed rows, the fixed N poles and the fixed S poles being alternately disposed in each of the fixed rows in a moving direction of the slider, and a lower row of the two fixed rows is directly opposing the movable magnet, the movable magnet having two movable rows of a movable N pole and a movable S pole, a total of two poles of one movable N pole and one movable S pole in each of the movable rows disposed in the moving direction, and an upper row of the two movable rows is directly opposing the fixed magnet, the movable N pole and the movable S pole of the upper row of the two movable rows being disposed in order to attract to the fixed magnet when the slider is in the first position and the second position, two fixed end poles of the fixed magnet at both ends of the lower fixed row each have a width L21, in the moving direction, two fixed central poles between the two fixed end poles of the lower fixed row each have a width L22, in the moving direction, the movable N pole and the movable S pole of the upper row each have a width L10, in the moving direction, wherein L22>L10>L21, wherein, when the movable magnet is in a first position along the moving direction and a left outermost edge of the movable magnet aligns with a left outermost edge of the fixed magnet, one fixed end pole and one fixed central pole of the fixed magnet biases the movable N pole and the movable S pole of the moving magnet in a left direction and not a right direction along the moving direction, wherein, when the movable magnet is in a second position along the moving direction and a right outermost edge of the movable magnet aligns with a right outermost edge of the fixed magnet, another fixed end pole and another fixed central pole of the fixed magnet biases the movable N pole and the movable S pole of the moving magnet in the right direction and not the left direction along the moving direction.

2. The electronic apparatus according to claim 1, wherein a first contact portion contacts the slider when located at the first position to restrict a movement of the slider; and a second contact portion that contacts the slider when located at the second position to restrict the movement of the slider, wherein the movable magnet and the fixed magnet are disposed so that the an N pole on one of the magnets and an S pole on the other magnet are displaced in the moving direction of the slider to press the slider, when in the first position, against the first contact portion, and are disposed so that the N pole on one of the magnets and the S pole on the other magnet are displaced in the moving direction of the slider to press the slider, when in the second position, against the second contact portion.

3. The electronic apparatus according to claim 1, wherein when the slider is located in the first position or in the second position, the fixed magnet and the movable magnet face each other with the same poles overlapping in a width that is narrower than a width of each of the poles at both ends of the fixed magnet.

4. The electronic apparatus according to claim 1, wherein the first position is one side along the moving direction, and the second position is the other side along the moving direction, when the slider is in the first position, one pair of ends of the fixed magnet and movable magnet is in a same position, and when the slider is in the second position, the other pair of ends of the fixed magnet and movable magnet is in a same position.

5. A slider mechanism comprising:

a slider that is movable between a first position and a second position relative to a chassis;

a movable magnet at the slider; and a fixed magnet at the chassis, the fixed magnet having two fixed rows of fixed N poles and fixed S poles, a total of four poles of fixed N poles and fixed S poles in each of the fixed rows, the fixed N poles and the fixed S poles being alternately disposed in each of the fixed rows in a moving direction of the slider, and a lower row of the two fixed rows is directly opposing the movable magnet, the movable magnet having two movable rows of a movable N pole and a movable S pole, a total of two poles of one movable N pole and one movable S pole in each of the movable rows disposed in the moving direction, and an upper row of the two movable rows is directly opposing the fixed magnet, the movable N pole and the movable S pole of the upper row of the two movable rows being disposed in order to attract to the fixed magnet when the slider is in the first position and the second position, two fixed end poles of the fixed magnet at both ends of the lower fixed row each have a width L21, in the moving direction, two fixed central poles between the two fixed end poles of the lower fixed row each have a width L22, in the moving direction, the movable N pole and the movable S pole of the upper row each have a width L10, in the moving direction, wherein L22>L10>L21, wherein, when the movable magnet is in a first position along the moving direction and a left outermost edge of the movable magnet aligns with a left outermost edge of the fixed magnet, one fixed end pole and one fixed central pole of the fixed magnet biases the movable N pole and the movable S pole of the moving magnet in a left direction and not a right direction along the moving direction, wherein, when the movable magnet is in a second position along the moving direction and a right outermost edge of the movable magnet aligns with a right outermost edge of the fixed magnet, another fixed end pole and another fixed central pole of the fixed magnet biases the movable N pole and the movable S pole of the moving magnet in the right direction and not the left direction along the moving direction.

* * * * *